Aug. 25, 1959

D. KALILEC 2,900,844

DOUBLE SPINDLE POWER TOOL

Filed Sept. 22, 1958

Daniel Kalilec
INVENTOR.

BY *Clarence A. O'Brien*
*and Harvey B. Jacobson*
Attorneys

Aug. 25, 1959  D. KALILEC  2,900,844
DOUBLE SPINDLE POWER TOOL
Filed Sept. 22, 1958  5 Sheets-Sheet 3

Daniel Kalilec
INVENTOR.

Daniel Kalilec
INVENTOR.

Daniel Kalilec
INVENTOR.

United States Patent Office

2,900,844
Patented Aug. 25, 1959

2,900,844

DOUBLE SPINDLE POWER TOOL

Daniel Kalilec, Cortland, N.Y.

Application September 22, 1958, Serial No. 762,465

18 Claims. (Cl. 74—665)

This invention relates in general to new and useful improvements in power tools, and more specifically to an improved power tool which has two spindles so mounted whereby either of the spindles may be selectively individually projected for operation.

In many operations it is highly desirable that a portable power tool be provided with a plurality of spindles so that first one operation and then the other may be rapidly completed utilizing a single tool. For example, there are many instances where it is desirable to first drill a hole and then drive a screw into such hole. It is oftentimes inconvenient to have on hand both a power drill and a power screwdriver. As a result, it is necessary that the operator of the tool first drill the hole, then lay down the power drill and then finally drive the screw with a power screwdriver.

It is therefore the primary object of this invention to provide a power tool which is provided with at least two spindles, the spindles being so mounted whereby the spindles may be selectively individually projected in advance of other components of the power tool and the spindle driven to accomplish the desired operation after which the first projected spindle may be retracted and another spindle projected to make another operation.

Another object of this invention is to provide a combination drill and screwdriver which is portable and driven, the combination drill and screwdriver including first and second spindles mounting a drill and a screwdriver, the spindles being so mounted whereby one of the spindles may be projected in advance of the other and when so projected driven in order that there may be first accomplished a drilling operation and then a screwdriving operation with the same power tool.

Another object of this invention is to provide an improved double spindle power tool, the power tool including two spindles which are mounted in such a manner whereby one of the spindles may be projected in advance of the other and there being provided means for simultaneously projecting one of the spindles while retracting the other in order that the interchanging between one spindle and the other may be automatically accomplished.

A further object of this invention is to provided a double spindle power tool, the power tool including first and second spindle units each of which includes a fixed spindle support, a movable spindle support carried by the fixed spindle support and a spindle rotatably carried by the movable spindle support, and there being provided means for projecting one of the spindles and its movable spindle support while automatically retracting the other, and there being provided drive means which will drive the spindles when they are in their fully projected positions.

Still another object of this invention is to provide a double spindle power tool of the type which includes a pair of spindles which may be retracted and projected, the spindles having attached thereto feed means which are of such a nature whereby one of the spindles is projected while the other is retracted, the feed means being of such a nature whereby it may be readily driven from the same motor as that used in rotating the spindles.

A still further object of this invention is to provide an improved double spindle power tool of the type which includes a pair of spindles which may be selectively projected and retracted with the projection of one of the spindles resulting in the automatic retraction of the other spindle, there being provided a power unit for driving the spindles when in their fully projected positions, and there being connected to the power unit means for automatically effecting the projection and retraction of the spindles by means of a simple control.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now to the drawings in detail, it will be seen that there are illustrated the details of the double spindle power tool which is the subject of this invention, the power tool being referred to in general by the reference numeral 10. The power tool 10 includes a frame which is referred to in general by the reference numeral 12.

The frame 12 includes a front plate 14, an intermediate plate 16 and a rear plate 18. The intermediate plate 16 is secured to the frame 14 in spaced relation by means of a plurality of spacers 20 and small bolts 22. The plate 18 is secured to the plate 16 by means of a plurality of spacers 24 and small bolts 26. The spacers 24 are very similar to the spacers 20, but are longer than the spacers 20. The small bolts 22 are threadedly engaged into the ends of the spacers 20 and the small bolts 24 are threadedly engaged into the ends of the spacers 24.

Figure 4:
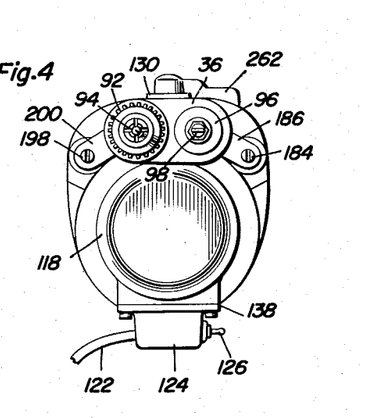
Figure 4 is a front view of the power tool and shows the relationship of the drill spindle and the screwdriver spindle.
Figures 5, 6:
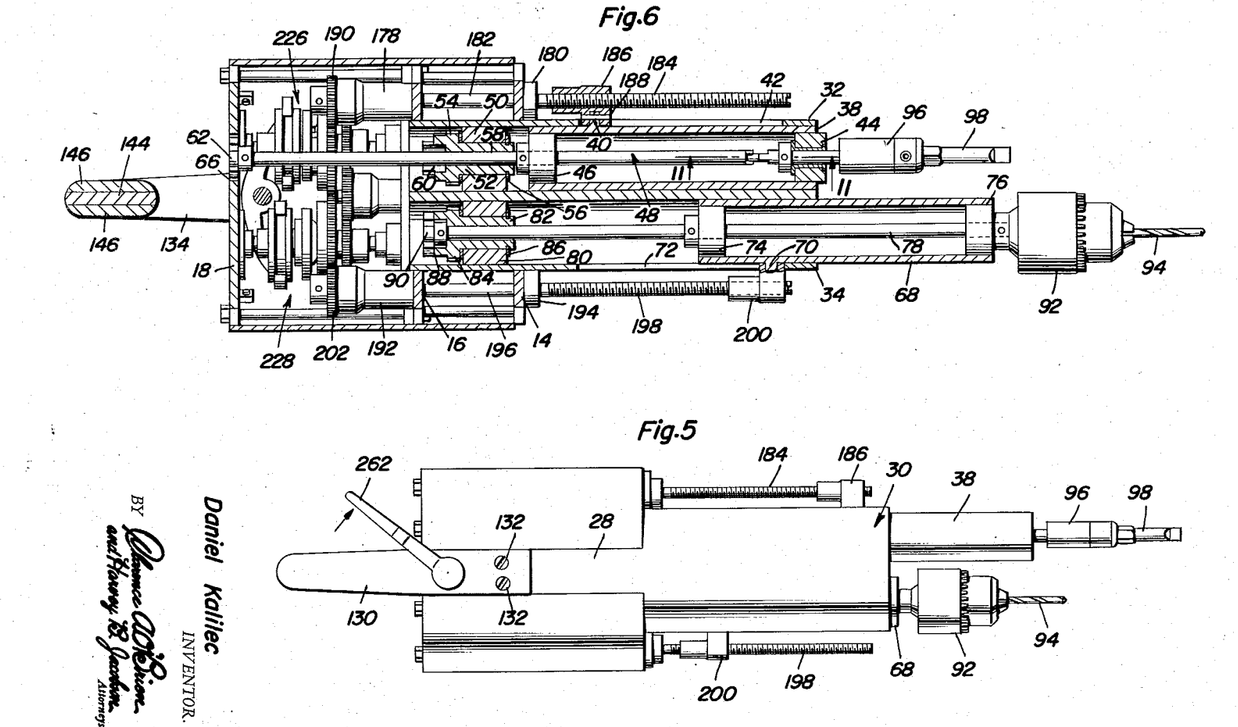
Figure 5 is a plan view similar to Figure 2 and shows the screwdriver spindle projected and the screwdriver spindle retracted.
Figure 6 is a horizontal sectional view taken substantially upon the plane indicated by the section line 6—6 of Figure 1 and shows the specific details of the spindle units and the manner in which the individual spindles thereof are supported, the view being on a slightly larger scale than Figure 1.

Extending across the upper ends of the plates 14, 16 and 18 is a main frame member 28 which terminates at the forward end thereof in a double barrel support unit 30 which, as is best shown in Figure 6 includes a pair of tubular fixed spindle supports 32 and 34. The forward ends of the fixed spindle supports 32 and 34 are connected together by a plate 36 which is best illustrated in Figure 4. It is to be noted that the spindle supports 32 and 34 terminate just rearwardly of the intermediate plate 16.

Slidably supported in the fixed spindle support 32 is a tubular movable spindle support 38. The spindle support 38 is limited to longitudinal sliding movement by an ear 40 which projects through a longitudinal opening 42 formed in the fixed spindle support 32. Disposed at opposite ends of the movable spindle support 38 are bearing members 44 and 46. Rotatably journaled in the bearing members 44 and 46 for movement with the movable spindle support 38 is a spindle 48.

Located in the fixed spindle support 32 rearwardly of the movable spindle support 38 is a bearing type support 50 in which there is rotatably journaled a constantly rotating drive member 52. The drive member 52 is provided on the rear portion thereof with a gear element 54 and is retained in the bearing type support 50 by means of a lock ring 56.

The constantly rotating drive member 52 has a bore 58 which is aligned with the bearing supports 44 and 46 and in which there is rotatably journaled the rear portion of the spindle 48. The constantly rotating drive member 52 also includes a dog clutch half 60 on the rear part thereof which cooperates with a mating dog clutch half 62 on the rear end of the spindle 48. An opening 66 is formed in the rear plate 18 to permit the movement of the spindle 48 to the position illustrated in Figure 6.

Mounted within the fixed spindle support 34 for longitudinal movement only is a movable spindle support 68 which corresponds to the movable spindle support 38. The movable spindle support 68 is restricted in its movement to longitudinal movement only by means of a projecting part 70 which passes through a longitudinally extending opening 72 in the fixed spindle support 34.

The movable spindle support 68 is provided in the opposite ends thereof with bearing type supports 74 and 76. Rotatably journaled in the bearing type supports 74 and 76 is a spindle 78. The spindle 78 moves longitudinally with the movable spindle support 78 and is rotatable relative thereto.

Disposed in the rear portion of the fixed spindle support 34 is a bearing type support 80. The bearing type support 80 has rotatably journaled therein a constantly rotating drive member 82. The drive member 82 has formed on the rear part thereof a gear element 84. The constantly rotating drive member 82 is held in the bearing type support 80 by means of a retaining ring 86.

Formed on the rear part of the constantly rotating drive member 82 is one half of a dog clutch, the dog clutch half being referred to by the reference numeral 88. Secured to the rear end of the spindle 78 is a second dog clutch half 90 which cooperates with the dog clutch half 88 to drivingly connect the spindle 78 to the constantly rotating drive member 82 when the spindle 78 is in its fully projecting position.

Secured to the forward end of the spindle 78 to be driven thereby is a chuck 92. Removably carried by the chuck 92 is a drill bit 94. The chuck 92 may be of any type and the size of the drill 94 may be varied by merely interchanging drill bits.

The forward end of the spindle 48 is provided with a coupling 96 which releasably holds a screwdriver blade 98. The screwdriver blade 98 may be removed and replaced through the disassembly of the coupling 96.

Figure 11:
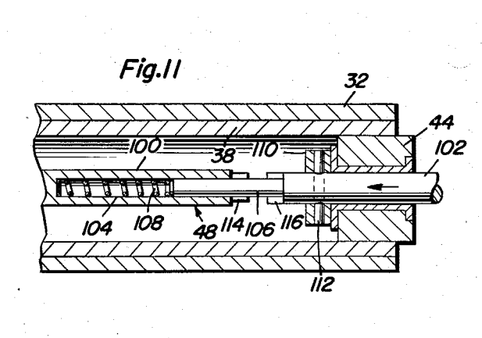
Figure 11 is an enlarged fragmentary sectional view taken substantially upon the plane indicated by the section line 11—11 of Figure 6 and shows the details of a torque controlled connection for the screwdriver spindle.

Referring now to Figure 11 in particular, it will be seen that the spindle 48 includes a rear spindle half 100 and a forward spindle half 102, the coupling 96 being mounted on the forward spindle half 102. The rear spindle half 100 has a longitudinal bore 104 formed therein in which there is positioned a reduced rear portion of the forward spindle half 102, the reduced rear portion being referred to by the reference numeral 106. Disposed in the rear part of the bore 104 is a coil spring 108 which bears against the rear end of the reduced portion 106 so as to urge the forward half 102 forwardly to the position illustrated in Figure 11. This is the normal position of the forward half 102 of the spindle 48 when the screwdriver blade 98 is not in use. The forward movement of the forward half 102 is limited by means of a collar 110 which is secured to the forward half 102 by means of a pin 112 and which bears against the rear part of the bearing type support 44. Formed on the forward end of the rear spindle half 100 is a dog clutch half 114. A complementary dog clutch half 116 is formed on the rear end of the forward spindle half 102. When the screwdriver blade 98 is being used to drive a screw, pressure is applied longitudinally of the forward spindle half 102 to move it rearwardly against the resistance of the spring 108 until the dog clutch halves 114 and 116 coact to rotate the forward spindle half 102 upon the rotation of the rear spindle half 100. However, when there is an excess torque required to drive a screw with the screwdriver blade 98, the dog clutch halves 114 and 116 will attempt to separate and the torque becomes excessive, they will force the forward spindle half 102 forwardly and thus uncouple the forward spindle half 102 from the rear spindle half 100.

In the use of the power tool 10, it is desired that either the drill portion thereof be used or the screwdriver portion thereof be used. When it is desired to use the drill portion, the spindle 78 and the movable spindle support 68 are projected to the positions illustrated in Figure 6. At this time the spindle 78 is coupled to the constantly rotating drive member 82 so that the spindle 78 is rotated. At the same time the spindle 48 and its movable spindle support 38 have been retracted to the retracted position of Figure 6 whereby the screwdriver blade 98 is in an out-of-the-way position. Although the constantly rotating drive member 52 will constantly rotate, the spindle 48 will remain stationary as there is no connection between the two at that time.

In order that the constantly rotating drive members 52 and 82 may be driven, there is provided an electric motor 118 which is secured to the front plate 14 in advance thereof and which includes a drive shaft in the form of a pinion 120. While an electric motor has been illustrated, it is to be understood that any type of power unit may be used, for example, air motors and the like. The electric motor 118 is provided with an electric cord 122. The electric cord 122 has incorporated therein a switch 124 which is mounted on the underside of the electric motor 118 and which is controlled by means of a toggle type operator 126.

Figure 2:
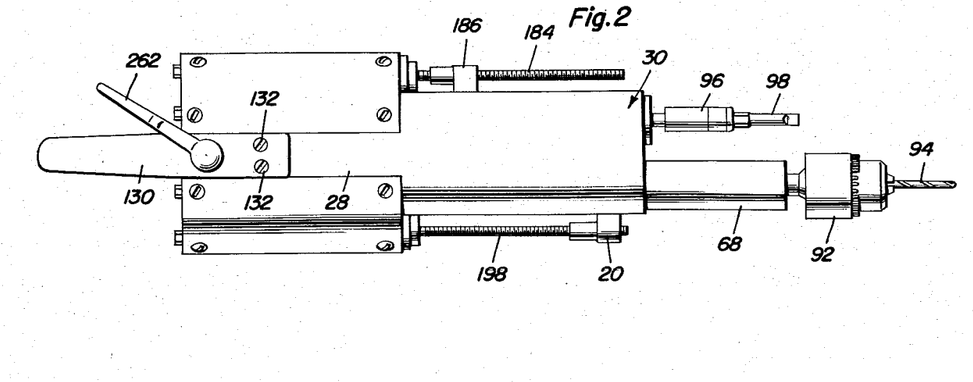
Figure 2 is a top plan view of the power tool of Figure 1 and shows the arrangement of the screwdriver spindle and the drill spindle.

In order to facilitate the handling of the power tool 10, there is provided a handle assembly which is referred to in general by the reference numeral 128. The handle assembly 128 includes a top support 130 which overlies the rear portion of the main frame member 28 and which is secured thereto by means of suitable fasteners 132, as is best shown in Figure 2. The upper handle support 130 extends rearwardly of the rear plate 18. The handle assembly 128 also includes a lower handle support 134 which includes an offset forward portion 136 disposed forwardly of the plate 14 and which terminates in a forward portion 138 which is disposed intermediate the switch 124 and the electric motor 118. The plate 138 is secured in place by means of fasteners 140. The switch 124 is secured to the forward portion 138 by means of fasteners 142.

Figure 1:
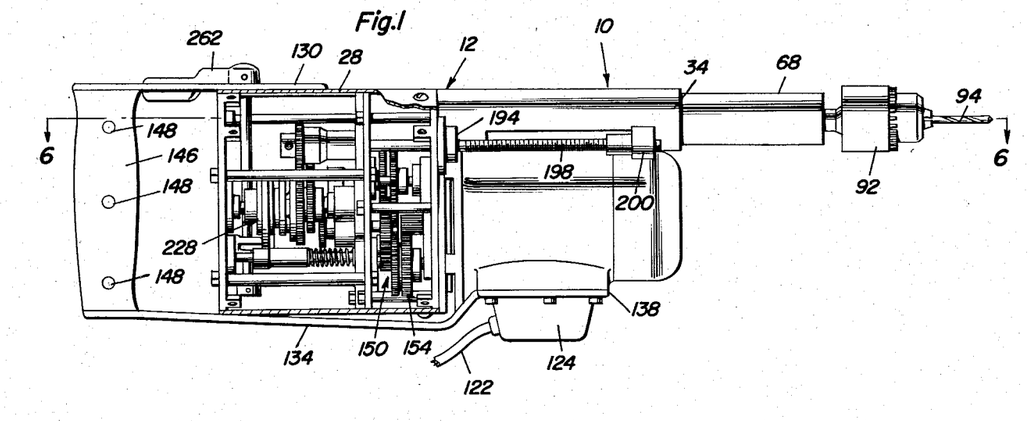
Figure 1 is a side elevational view of the double spindle power tool which is the subject of this invention and shows the power tool with the drill spindle thereof projecting foremost, a portion of the cover of the tool being omitted for the purpose of illustrating the details of the various drive elements of the tool.

Extending between the handle supports 134 and 130 is a grip reinforcing member which is best illustrated in Figure 6. The grip reinforcing member is referred to by the reference numeral 144 and has secured to opposite sides thereof grip plates 146, the grip plates 146 being secured in place by means of fasteners 148 which are best illustrated in Figure 1.

In order that the constantly rotating drive members 56 and 82 may be constantly driven, there are mounted between the plates 14 and 16 suitable drive means which are referred to in general by the reference numeral 150. These drive means include a shaft 152 which extends between and is suitably journaled in the plates 14 and 16. Mounted on the shaft 152 is a large gear unit which includes a gear 154 which is meshed with the pinion 120. Connected to the gear 154 for rotation therewith is a gear 156 and a pinion 158.

Disposed parallel to the shaft 152 and extending between and rotatably journaled in the plates 14 and 16 is a shaft 160. Mounted on the shaft 160 for rotation therewith and meshed with the gear 156 is a gear 162. The gear 162 is in turn meshed with a gear 164 secured to a shaft 166 which extends between the plates 14 and 16 and is rotatably journaled therein. The gear 164 in turn is meshed with the gear element 84 to constantly drive the constantly rotating drive member 82.

Extending through the plate 16 and rotatably journaled in a bearing portion 168 thereof (Fig. 7) is a shaft 170. The shaft 170 has secured to the forward end thereof a gear 172 which is meshed with the pinion 158. The gear 172 is also meshed with a gear 174 carried by a shaft 176 which extends between and is journaled in the plates 14 and 16. The gear 174 is meshed with the gear element 54 to constantly drive the constantly rotating drive member 52.

At this time it is pointed out that the gear train 150 can be varied as desired. The gear train illustrated and described is only one of the many combinations by which the constantly rotating drive members 52 and 82 may be constantly rotated in the same direction. Only this drive and the driving of the shaft 170 is required from the gear train 150.

Referring once again to Figure 6 in particular, it will be seen that there is carried by the plate 16 at the left side thereof a rearwardly extending bearing type support 178. The bearing type support 178 is aligned with a forwardly projecting bearing type support 180 on the plate 14. Rotatably journaled in the bearing type supports 178 and 180 is a shaft portion 182 of a feed screw 184. The feed screw 184 has threadedly engaged thereon a follower 186 which is connected to the projecting part 40 of the movable spindle support 38 by means of a pin 188. Mounted on the rear end of the shaft portion 182 is a gear segment 190 for effecting the rotation of the feed screw 184.

Also carried by the plate 16 and projecting rearwardly therefrom is a bearing type support 192. The bearing type support 192 is aligned with a bearing type support 194 carried by the plate 14 and projecting therefrom. Rotatably journaled in the bearing type supports 192 and 194 is a shaft portion 196 of a feed screw 198. The feed screw 198 has threadedly engaged thereon a follower 200 which is secured to the projecting part 70 of the movable spindle support 68. In order to effect rotation of the feed screw 198, there is mounted on the rear end of the shaft 196 a gear element 202.

Inasmuch as it is the intention that when one of the spindles is projected the other is retracted, it is necessary that the feed screws and their respective followers so function. The feed screws 184 and 198 are of the same thread and for that reason they must be turned in opposite directions to accomplish the desired projection and retraction of the spindles.

Figure 9:
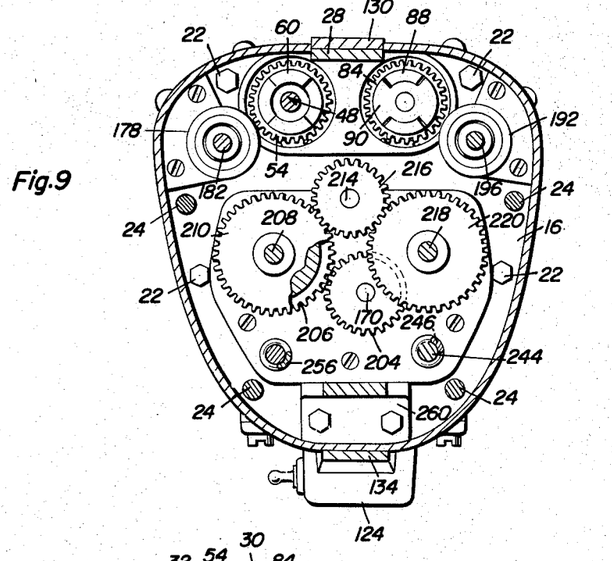
Figure 9 is an enlarged transverse sectional view taken substantially upon the plane indicated by the section line 9—9 of Figure 7 and shows further the details of the means for effecting the driving of the feed screws and the spindles.
Figure 10:
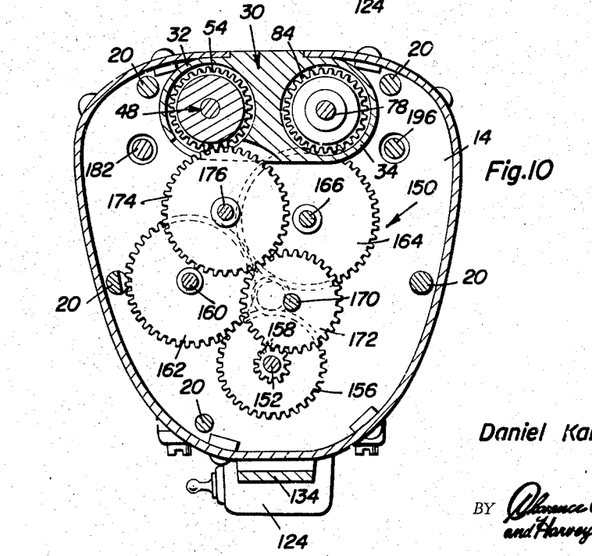
Figure 10 is an enlarged transverse sectional view taken substantially upon the plane indicated by the section line 10—10 of Figure 7 and shows the specific details of the drive train for driving the spindles.

Referring now to Figure 9 in particular, it will be seen that the shaft 170 has mounted on the rear end thereof a gear 204. The gear 204 is meshed with a gear 206 secured on a shaft 208 which extends between and is rotatably journaled in suitable supports carried by the plates 16 and 18. Also mounted on the shaft 208 for rotation with the shaft 208 and the gear 206 is a gear 210.

Extending rearwardly from the plate 16 is a bearing type support 212 (Fig. 7) in which there is rotatably journaled a shaft 214. The shaft 214 has mounted thereon a gear 216 which is meshed with the gear 210 and driven thereby.

Figure 7:
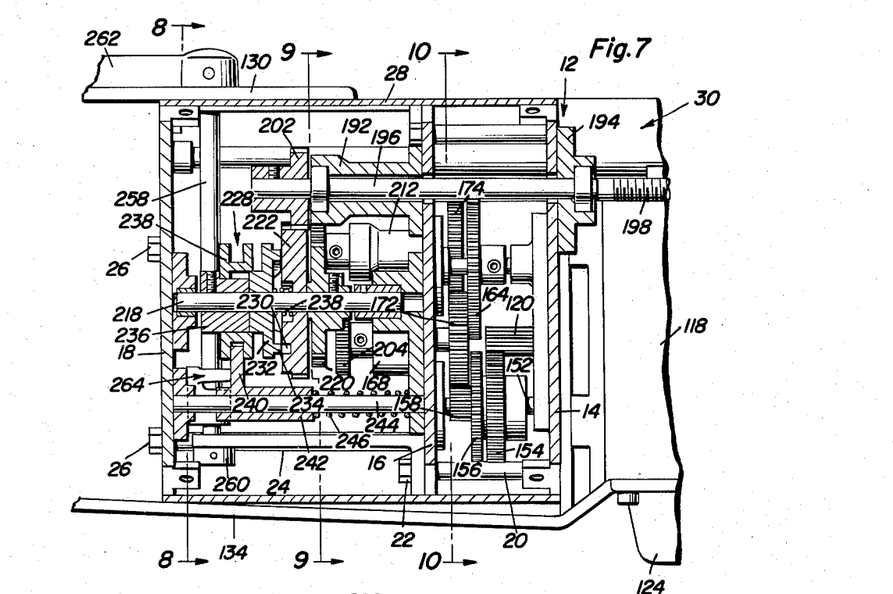
Figure 7 is an enlarged fragmentary sectional view taken substantially upon the plane indicated by the section line 7—7 of Figure 2 and shows the specific details of the clutch means for driving the feed screws for projecting and retracting the spindles.

Extending between and suitably journaled for rotation in supports carried by the plates 16 and 18 is a shaft 218 which corresponds with the shaft 208. The shaft 218 has mounted thereon for rotation therewith a gear 220 which is meshed with the gear 216. Inasmuch as the gears 210 and 220 are both meshed with the gear 216, it will be seen that the shafts 208 and 218 rotate in opposite directions.

Referring now to Figure 7 in particular, it will be seen that there is rotatably mounted on the shaft 218 rearwardly of the gear 220 a gear 222 which is meshed with the gear element 202. Thus when the gear 222 is rotated, the shaft 196 and the feed screw 198 are also rotated.

Mounted on the shaft 208 rearwardly of the gear 210 is a gear 224 which corresponds to the gear 222 and which is meshed with the gear element 190. Thus when the gear 224 is rotated, the gear element 190 and the shaft portion 182 are rotated. It is to be noted that the gears 222 and 224 are meshed so that the shaft elements 182 and 196 are rotated in opposite directions.

In order that the shaft portion 182 may be first rotated in one direction and then the other in order to effect the projection and retraction of the spindle 48, it is necessary that there be provided alternate drives for the gear 224. It is also desirable that there be provided alternate drives for the gear 222 in order that the direction of rotation of the shaft portion 196 may be varied. This is accomplished by providing clutches 226 and 228 on the shafts 208 and 218, respectively. Inasmuch as the clutches 226 and 228 are identical, only the clutch 228 will be described in detail hereinafter.

The clutch 228 includes recesses 230 in the rear face of the gear 222. Mounted on the shaft 218 for both sliding and rotary movement is a drive member 232. The drive member 232 has projecting lugs 234 which may project into the recesses 230 to lock the drive member 232 to the gear 222. The drive member 232 has a sliding drive connection with a drive element 236 secured to the shaft 218 for rotation therewith. Thus while the drive member 232 may be moved longitudinally of the shaft 218, it is constantly rotated by the shaft 218. The drive member 232 is normally retained out of engagement with the gear 222 by means of a compression spring 238 disposed between the two and mounted on the shaft 218.

Rotatably journaled on the drive element 236 and slidable relative thereto is a clutch control collar 238. The clutch control collar 238 is engaged by a yoke 240 which is carried by a sleeve 242 which is mounted for sliding movement only on a shaft 244 which extends between and is supported by the plates 16 and 18. The sleeve 242 is urged rearwardly by means of a coil spring 246 mounted on the forward part of the shaft 244.

Figure 3:
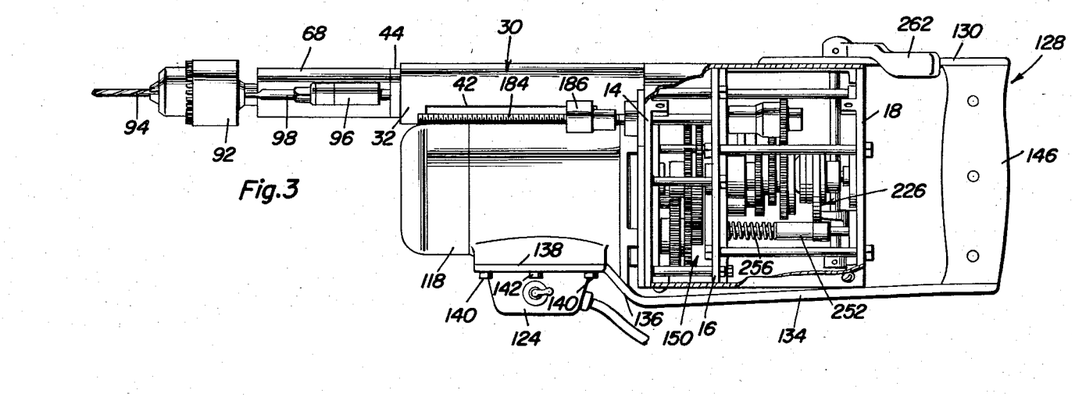
Figure 3 is a side elevational view similar to Figure 1 and shows the opposite side of the power tool.

The clutch 226 also has a clutch control collar 248 which corresponds to the clutch control collar and which has engaged therewith a yoke 250. The yoke 250 is mounted on a sleeve 252 carried by a shaft 254 which corresponds to the shaft 244. A coil spring 256 is mounted on the forward part of the shaft 254 and engages the sleeve 252 to urge the sleeve 252 rearwardly. The spring 256 is best illustrated in Figure 3. The springs 246 and 256 cooperate to retain the yokes 240 and 250 in neutral positions.

Figure 8:
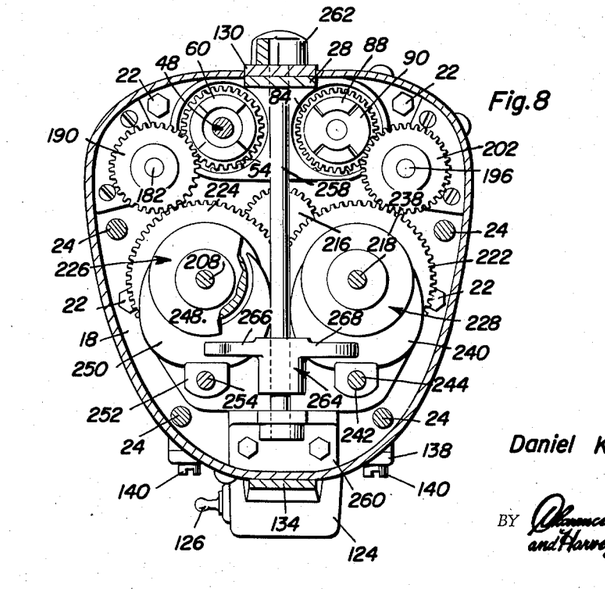
Figure 8 is an enlarged transverse sectional view taken substantially upon the plane indicated by the section line 8—8 of Figure 7 and shows the specific details of the drive means for both driving the spindles and the feed screws.

In order that the clutches 226 and 228 may be selectively actuated, there is provided a vertical control shaft 258. The vertical control shaft 258 has the upper portion thereof journaled in the main frame member 28 and the upper handle support 130. The lower end of the clutch control shaft 258 is journaled in a fitting 260 secured to the rear plate 18, as is best shown in Figure 8. The clutch control shaft 258 projects above the upper handle support 130 and has secured thereto a control lever 262. The control lever 262 is in a position whereby it may be engaged by one's thumb with the hand gripping the handle assembly 128.

Secured to the lower part of the clutch control shaft 258 is a double ended lever 264 which includes lever portions 266 and 268. The lever portion 266 is in position to engage the rear surface of the yoke 250 and urge it forwardly so as to engage the clutch 226. The lever portion 268 is disposed rearwardly of the yoke 240 and positioned for moving the yoke 240 forwardly to engage the clutch 228.

When the clutch 228 is engaged, the gear 222 is driven from the shaft 218. On the other hand, when the clutch 226 is engaged, the gear 224 is driven from the shaft 208. Inasmuch as the shafts 208 and 218 are rotating in opposite directions, it will be seen that in one instance the feed screws 184 and 198 will be rotated in one direction, that is the feed screw 184 will be rotating clockwise and the feed screw 198 will be rotating counterclockwise, and in the other instance the feed screws are rotated in the opposite direction, that is the feed screw 184 will be rotated in a counterclockwise direction and the feed screw 198 will be rotated in a clockwise direction. Thus by moving the control lever 262, the drill attachment may be projected and the screwdriver attachment may be retracted so that the drill attachment may be used. On the other hand, when the control lever 262 is moved in the opposite direction, the screwdriver attachment will be projected and the drill attachment will be retracted so that the screwdriver attachment may be utilized.

From the foregoing, it will be readily apparent that there has been devised a simple double spindle tool which is of such a nature whereby the spindles are simultaneously projected and retracted so that the operating condition of the tool may be rapidly changed whereby it is feasible to first drill a hole with the tool, and then to drive a screw into the hole utilizing the same tool.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, and drive means connected to said power shaft and said spindles for rotating said spindles when in fully projecting positions.

2. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, drive means connected to said power shaft and said spindles for rotating said spindles when in fully projecting positions, and other drive means connecting said spindle positioning means to said power shaft for operation by said motor.

3. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, and drive means connected to said power shaft and said spindles for rotating said spindles when in fully projecting positions, said drive means including a constantly rotating drive element carried by each of said fixed spindle supports, and cooperating connecting means on said constantly rotating drive element and the respective spindle connecting said spindle to said constantly rotating drive element only when said spindle is fully projected.

4. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, and drive means connected to said power shaft and said spindles for rotating said spindles when in fully projecting positions, said drive means including a constantly rotating drive element carried by each of said fixed spindle supports, and cooperating connecting means on said constantly rotating drive element and the respective spindle connecting said spindle to said constantly rotating drive element only when said spindle is fully projected, and reduction gearing intermediate said power shaft and said constantly rotating drive elements.

5. A multiple spindle power tool comprising a frame, a motor carried by said frame, said motor including a power shaft, two spindle units secured to said frame, each of said spindle units comprising a fixed spindle support rigidly secured to said support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, and drive means connected to said power shaft and said spindles for rotating said spindles when in fully projecting positions, said drive means including a constantly rotating drive element carried by each of said fixed spindle supports, and cooperating connecting means on said constantly rotating drive element and the respective spindle connecting said spindle to said constantly rotating drive element only when said spindle is fully projected, and other drive means connecting said spindle positioning means to said power shaft for operation by said motor.

6. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, drive means connected to said power shaft and said spindles for rotating said spindles when in fully projecting positions, said drive means including a constantly rotating drive element carried by each of said fixed spindle supports, cooperating connecting means on said constantly rotating drive element and the respective spindle connecting said spindle to said constantly rotating drive element only when said spindle is fully projected, reduction gearing intermediate said power shaft and said constantly rotating drive elements, and other drive means connecting said spindle positioning means to said power shaft for operation by said motor.

7. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, drive means connected to said power shaft and said spindles for rotating said spindles when in fully projecting positions, said drive means including a constantly rotating drive element carried by each of said fixed spindle supports, and cooperating connecting means on said constantly rotating drive element and the respective spindle connecting said spindle to said constantly rotating drive element only when said spindle is fully projected, said cooperating connecting means being in the form of a dog clutch.

8. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, and drive means connected to said power shaft and said spindles for rotating said spindles when in fully projecting positions, said spindle positioning means including a feed screw for each spindle, a follower secured to each movable spindle support and threadedly engaged on the respective feed screw.

9. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, and drive means connected to said power shaft and said spindles for rotating said spindles when in fully projecting positions, said spindle positioning means including a feed screw for each spindle, a follower secured to each movable spindle support and threadedly engaged on the respective feed screw, and feed screw drive means connected to said feed screws for simultaneously rotating said feed screws in opposite directions.

10. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, and drive means connected to said power shaft and said spindles for rotating said spindles when in fully projecting positions, said spindle positioning means including a feed screw for each spindle, a follower secured to each movable spindle support and threadedly engaged on the respective feed screw, and feed screw drive means connected to said feed screws for simultaneously rotating said feed screws in opposite directions, said feed screw drive means including direction reversing means.

11. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, drive means connected to said power shaft and said spindles for rotating said spindles when in fully projecting positions, said spindle positioning means including a feed screw for each spindle, a follower secured to each movable spindle support and threadedly engaged on the respective feed screw, and feed screw drive means connected to said feed screws for simultaneously rotating said feed screws in opposite directions, said feed screw drive means including direction reversing means, said direction reversing means including first and second constantly rotating shafts rotating in opposite directions, and a clutch on each of said constantly rotating shafts for selectively coupling said feed screws to said constantly rotating shafts.

12. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, and drive means connected to said power shaft and said spindles for rotating said spindles when in fully projecting positions, said spindle positioning means including a feed screw for each spindle, a follower secured to each movable spindle support and threadedly engaged on the respective feed screw, and other drive means connecting said spindle positioning means to said power shaft for operation by said motor.

13. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, drive means connected to said power shaft and said spindles for rotating said spindles when in fully projecting positions, said spindle positioning means including a feed screw for each spindle, a follower secured to each movable spindle support and threadedly engaged on the respective feed screw, and feed screw drive means connected to said feed screws for simultaneously rotating said feed screws in opposite directions, said feed screw drive means being connected to said power shaft for operation by said motor.

14. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, drive means connected to said power shaft and said spindles for rotating said spindles when in fully projecting positions, said spindle positioning means including a feed screw for each spindle, a follower secured to each movable spindle support and threadedly engaged on the respective feed screw, feed screw drive means connected to said feed screws for simultaneously rotating said feed screws in opposite directions, said feed screw drive means including direction reversing means, said direction reversing means including first and second constantly rotating shafts rotating in opposite directions, a clutch on each of said constantly rotating shafts for selectively coupling said feed screws to said constantly rotating shafts, and other drive means connecting said constantly rotating shafts to said power shaft for operation by said motor.

15. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, drive means connected to said power shaft and said spindles for rotating said spindles when in fully projecting positions, said drive means including a constantly rotating drive element carried by each of said fixed spindle supports, and cooperating connecting means on said constantly rotating drive element and the respective spindle connecting said spindle to said constantly rotating drive element only when said spindle is fully projected, said spindle positioning means including a feed screw for each spindle, a follower secured to each movable spindle support and threadedly engaged on the respective feed screw.

16. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, drive means connected to said power shaft and said spindles for rotating said spindles when in fully projecting positions, said drive means including a constantly rotating drive element carried by each of said fixed spindle supports, cooperating connecting means on said constantly rotating drive element and the respective spindle connecting said spindle to said constantly rotating drive element only when said spindle is fully projected, said spindle positioning means including a feed screw for each spindle, a follower secured to each movable spindle support and threadedly engaged on the respective feed screw, and feed screw drive means connected to said feed screws for simultaneously rotating siad feed screws in opposite directions.

17. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, drive means connected to said power shaft and said spindles for rotating said spindles when in fully projecting positions, said drive means including a constantly rotating drive element carried by each of said fixed spindle supports, cooperating connecting means on said constantly rotating drive element and the respective spindle connecting said spindle to said constantly rotating drive element only when said spindle is fully projected, said spindle positioning means including a feed screw for each spindle, a follower secured to each movable spindle support and threadedly engaged on the respective feed screw, feed screw drive means connected to said feed screws for simultaneously rotating said feed screws in opposite directions, said feed screw drive means including direction reversing means, said direction reversing means including first and second constantly rotating shafts rotating in opposite directions, and a clutch on each of said constantly rotating shafts for selectively coupling said feed screws to said constantly rotating shafts.

18. A multiple spindle power tool comprising a frame, a motor carried by said frame, said motor including a power shaft, two spindle units secured to said frame, each of said spindle units comprising a fixed spindle support rigidly secured to said frame, a movable spindle support secured to said fixed spindle support for longitudinal movement between a retracted position and a projected position, a spindle supported by said movable spindle support for longitudinal movement therewith and rotary movement relative thereto, spindle positioning means connected to said movable spindle supports for simultaneously projecting one spindle and retracting the other, drive means connected to said power shaft and said spindles for rotating said spindles when in fully projecting positions, said drive means including a constantly rotating drive element carried by each of said fixed spindle supports, cooperating connecting means on said constantly rotating drive element and the respective spindle connecting said spindle to said constantly rotating drive element only when said spindle is fully projected, said spindle positioning means including a feed screw for each spindle, a follower secured to each movable spindle support and threadedly engaged on the respective feed screw, and feed screw drive means connected to said feed screws for simultaneously rotating said feed screws in opposite directions, said feed screw drive means being connected to said power shaft for operation by said motor.

References Cited in the file of this patent

UNITED STATES PATENTS

| | | |
|---|---|---|
| 2,303,565 | Luna | Dec. 1, 1942 |
| 2,401,002 | Longfelder | May 28, 1946 |
| 2,679,770 | Carter et al. | June 1, 1954 |